Jan. 14, 1964   E. V. RUTKOWSKI, JR   3,117,417
TWO-STAGE VALVE
Filed Nov. 26, 1958   2 Sheets-Sheet 1
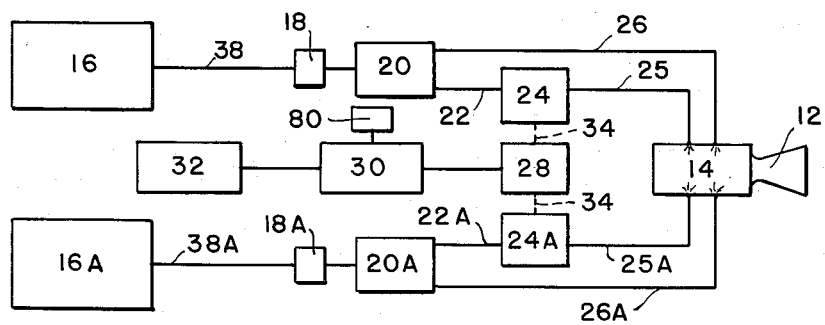
Fig. 2
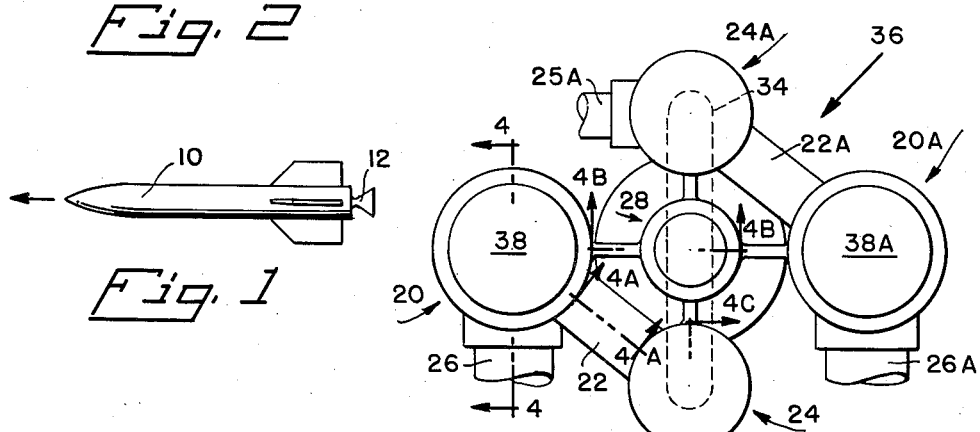
Fig. 1
Fig. 3
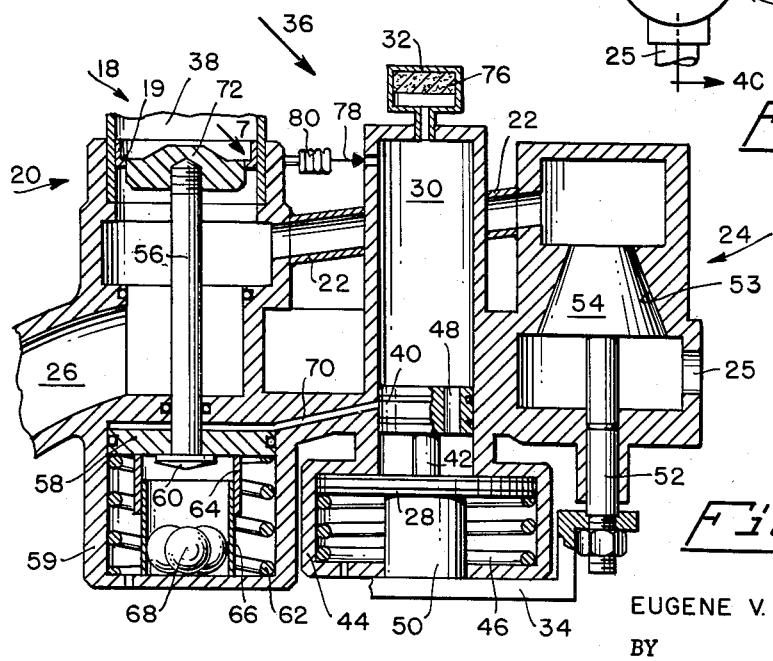
Fig. 4
INVENTOR.
EUGENE V. RUTKOWSKI, JR.
BY
ATTORNEYS.

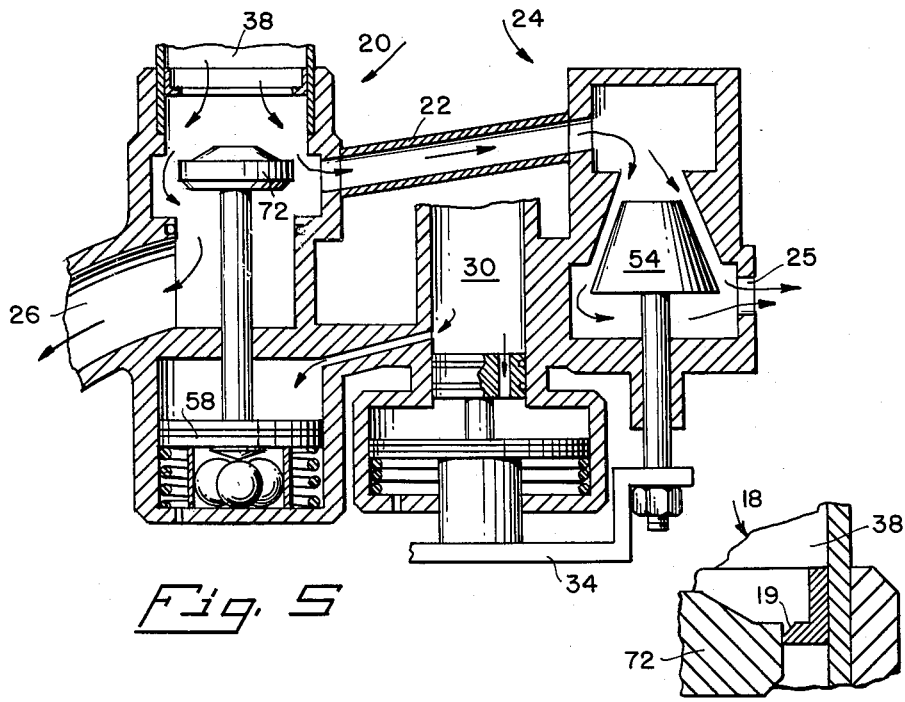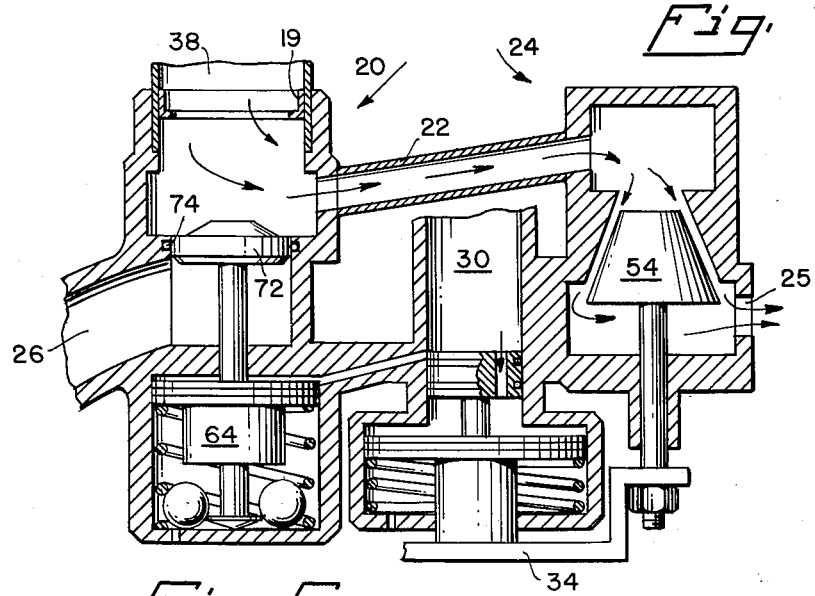

United States Patent Office 3,117,417
Patented Jan. 14, 1964

3,117,417
TWO-STAGE VALVE
Eugene V. Rutkowski, Jr., China Lake, Calif., assignor to the United States of America as represented by the Secretary of the Navy
Filed Nov. 26, 1958, Ser. No. 776,657
3 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to rockets of the liquid bi-propellant type and more particularly to improvements in apparatus for metering the bi-propellants to the rocket combustion chamber.

In certain types of rocket propelled missiles in which the trajectory remains within the earth's atmosphere it is essential that missile temperature, the increase in which results from air friction or shock wave effects, be held to certain limits. As an example, certain missiles are provided with nose sections having homing apparatus which is responsive to infra red radiations from a target, the operation of which apparatus is adversely affected if the nose section exceeds a critical limiting temperature. Similarly, the missile may contain other temperature sensitive apparatus, materials or explosive which must remain below certain critical limits of temperature to obviate malfunction of the missile. Since the missile temperature is a function of certain factors such as air temperature and air density over which there can be no control, and another factor, its velocity, which can be controlled, it is apparent that control of missile velocity in response to change in missile temperature provides a convenient means for limting missile temperature. Further, since missile velocity is a function of the rocket motor thrust, which in turn is a function of the rate of burning of the propellant it is apparent that if the missile temperature can be measured and utilized to control rate of burning of the propellant the missile velocity can be maintained at values which will not produce missile temperature above the critical limit. Control of the rate of burning of the propellant presents somewhat of a problem where a solid propellant is employed, however, where a liquid propellant is employed the problem can be more readily solved by metering the flow of the propellant to the combustion chamber.

The principal object of this invention in its boardest sense is to provide improvements in apparatus for metering or controlling flow of propellants to a rocket combustion chamber.

More specifically, another object is to provide apparatus for effecting an initial high rate of flow of the propellant to effect boost thrust to the missile to its maximum permissible velocity and then sustain the missiles at or below such velocity by a lesser rate of flow.

Another object is to provide a novel valve sytem for attaining the aforementioned objects which controls rate of flow of two liquids, sometimes referred to as a bi-propellant.

Still further objects, advantages and salient features will become more apparent from a consideration of the description to follow, the appended claims, and the accompanying drawings, in which:

FIG. 1 is a side elevation of a rocket employing the subject of the invention,

FIG. 2 is a diagrammatic illustration of a conduit system within the rocket,

FIG. 3 is a top plan of a valve device forming part of the system,

FIG. 4 is a composite cross section taken on lines 4—4, 4A—4A, 4B—4B, and 4C—4C of FIG. 3, showing initial positions of parts, FIG. 5 is a section like FIG. 4 showing an intermediate position of parts, FIG. 6 is a section like FIG. 4 showing the final position of parts, and FIG. 7 is an enlarged detail adjacent arrow T, FIG. 4.

Referring to the drawing, and particularly to FIGS. 1 and 2, the subject of the invention comprises, in general, a rocket propelled missile 10 having a propulsion nozzle 12 at its rear end through which products of combustion exhaust, these being formed by the reaction of two liquid propellants in a combustion chamber 14 disposed within the missile. The propellants 16, 16A are stored within suitable containers within the missile and unauthorized flow therefrom is prevented by rupturable seals 18, 18A. When the missile is launched the seals are ruptured and propellant 16 flows through primary valve 20 and conduit 26 to the rocket motor combustion chamber 14, a portion flowing through a by-pass conduit 22 to secondary valve 24 and thence through conduit 25 to the combustion chamber. Similarly, propellant 16A flows through ruptured seal 18A, primary valve 20A and conduit 26A to the combustion chamber, a portion flowing through by-pass conduit 22A to secondary valve 24A and thence through conduit 25A to the combustion chamber. After a preliminary flow of propellants to attain an initial boost thrust stage of the missile the high rate of flow is reduced to a considerable lesser rate of flow for sustaining the missile motion through its sustainer thrust stage. At this stage, conduits 26, 26A are closed and all of the flow to the combustion chamber is through secondary valves 24, 24A. The amount of opening and hence the degree of metering of the propellant is under control of a main control piston 28 operated by variable gas pressure, illustrated as a pressure chamber 30, the latter being supplied with gas under pressure from a suitable pressure source 32. The dotted lines in FIG. 2 illustrate a mechanical interconnection 34 between the control piston and the secondary valves, which will subsequently be described.

Referring now to FIGS. 3 and 4, the valve device previously, but briefly referred to, comprises a unitary body 36 containing or having associated therewith seals 18, 18A, primary valves 20, 20A, secondary valves 24, 24A, by pass conduits 22, 22A, control piston 28, pressure chamber 30, mechanical interconnection 34, outlet conduits 25, 25A, 26, 26A and inlet conduits 38, 38A. FIG. 3 is intended only to show the general arrangement of parts; that the primary and secondary valves are identical pairs, thereby requiring further description of only one pair; and the mechanical interconnection 34 which operates both of the secondary valves in unison in response to equal increments of movement of control piston 28.

Referring now to FIG. 4 which, as previously referred to, is a composite cross section of several sections of FIG. 3, body 36 comprises a generally central bore or pressure chamber 30 containing a piston type slide valve 40 connected by a valve stem 42 to the control piston 28 slideably contained in a cylinder 44. A compression spring 46 disposed beneath the control piston urges it upwardly whereas pressure in chamber 30, sufficient to overcome the spring bias urges it downwardly, this pressure being applied through one or more apertures 48 extending through the piston valve. Slidable seals, such as O-rings, as shown, are employed on the piston valve and control piston to prevent gas leakage past these parts. A piston rod or stem 50 forms a part of the control piston, its lower end being affixed to a crosshead 34, previously referred to as a mechanical interconnection, the latter having its ends affixed to both of the secondary valve stems, one stem 52 being shown in FIGS. 4 to 6.

Valve stem 52 is affixed to a conical poppet type valve head 54 which seats on a mating seat 53 in secondary valve 24. As will be apparent, when control piston 28 moves downwardly from the position shown in FIG. 4, secondary valve 24 will open and permit flow from conduit 22 to outlet conduit 25 after other conditions have been satisfied, as will hereinafter appear.

Referring now to the left side of FIG. 4, inlet conduit 38 contains a rupture member 18, which is generally cup-shaped, brazed or otherwise sealed to a central valve head 72 surrounded by an annular weakened zone 19. The valve head is affixed to the upper end of a valve stem 56, the lower end of the latter slideably extending through a central bore in an actuating piston 58 slidable in cylinder 59. A valve stem head or abutment 60 is formed on the lower end of the valve stem so that as the actuating piston moves downwardly the valve stem will move with the actuating piston and shear the rupture seal at its weakened zone 19. Actuating piston 58 is urged upwardly to the position shown in FIG. 4 by a spring 62 and is provided with an annular skirt 64 extending downwardly from its lower face, this skirt slidably engaging the outside of a brittle frangible tube 66 which contains three balls which form an abutment for valve stem head 60. Suitable O-ring seals, as shown, are employed to prevent leakage of the fluids.

In the operation of the device it will be assumed that the liquid propellants are unpressurized and any unauthorized flow is prevented by the seals 18, 18A. Pressure is now applied to pressure chamber 30. Control piston 28 moves downwardly opening the secondary valves to fully opened position as shown in FIG. 5. When piston valve 40 uncovers port or conduit 70 pressure is applied to the top of actuating piston 58 which tends to move downwardly stressing but not shearing seal 18. Next, the propellants are pressurized applying pressure to the top or upstream surfaces of the rupture seals which pressure, added to the stressed seals is sufficient to rupture same. (If desired, however, the seals may be weakened to an extent to permit their rupture by the pressure applied to piston 58.) Actuating piston 58 now moves downwardly sufficient to abut the upper edge of frangible tube 66 and crushes it into small fragments. At this position, however, the piston skirt has passed partly around the balls preventing them from moving radially outward. Continued movement produces an arrangement of parts as shown in FIG. 5 wherein valve stem head 56 abuts the balls confined within skirt 64, thus limiting downward movement of valve head 72 which formed a part of the original rupture seal 18. The major flow of one of the propellants is now through conduit 38, around valve head 72, and out of conduit 26. The minor flow of this propellant is through by pass circuit 22, around secondary valve head 54 and out of conduit 25. As will be apparent, the flow of the other propellant is the same as the one just described and all valves are now fully open.

When the missile temperature controls command cessation of the relatively large propellant flow at the end of the boost thrust phase pressure in chamber 30 is reduced sufficient to permit actuating piston 58 to return to its original position under urge of its spring, as shown in FIG. 6. As it moves upwardly skirt 66 passes above the balls thus releasing their confinement within the skirt. Since there is a considerable differential pressure on opposite sides of valve head 72 (approx. 150 p.s.i.), the valve head and its affixed valve stem move downwardly, the lower end of the valve stem forcing the balls radially outwardly and permitting the valve stem and valve head to assume their final position shown in FIG. 6 wherein the periphery of the valve head now engages an O-ring 74 shutting off flow through conduit 26. All of the flow is now through conduits 22, 22A, through secondary valves 24, 24A and out of conduits 25, 25A, the rate of flow being metered by the position of control piston 24 in response to variations is pressure in pressure chamber 30. The pressure in chamber 30 may be controlled as desired, however, a preferred manner of controlling same is by providing a pressure source 32 which contains a solid propellant 76 (considerably larger than shown in FIG. 4) which, when ignited, produces gas at substantially constant pressure, this gas being delivered to the pressure chamber. A suitable bleed valve 78 moves in response to missile skin temperature sensing device 80 and reduces the pressure in chamber 30 to any desired value below the constant pressure gas source.

While the size of the propellant flow valve and the various pressures employed in the system may vary for different missiles the following data will serve as an example: The valve disclosed fits into an approximate 9½" diameter, weighs 20 lbs., and at boost flow, 40 lbs. of red fuming nitric acid and 13⅓ lbs. of dimethyl hydrazine are supplied to the combustion chamber under propellant tank pressure of 2200 p.s.i. This pressure drops linearly to about 600 p.s.i. with a sustain flow of approximately ⅓ of boost flow. The boost thrust stage lasts for about 3–6 seconds and sustain thrust stage for about 115 seconds. The control pressure provided by source 32 is 800–1000 p.s.i. maximum which pressure is also applied to the control piston during the boost thrust stage. During the sustain thrust stage the control pressure in chamber 30 is between 200 p.s.i. and the maximum control pressure.

With the considerable difference in rates of flow during boost and sustain thrust stages (the latter being about ⅓ of the former) it will be apparent that if only one set of combustion chamber nozzles for the oxidizer and one set for the fuel were provided the issuing velocities during sustain flow would decrease materially and not produce optimum combustion. To avoid this, two sets of combustion chamber nozzles for each propellant are provided so that each produces optimum combustion at its designed rate of flow. Thus, the set of nozzles connected to each of conduits 26, 26A produce optimum combustion during the boost stage and the similar sets of nozzles connected to conduits 25, 25A produce optimum combustion during the sustain stage, depending upon the extent of throttling through secondary valves 24, 24A as they vary in extent of opening under control of the missile temperature sensing apparatus. Details of the injectors have been omitted in the interests of clarity and since they do not form, per se, any part of this invention.

Obviously many modifications and variations of the present invention are possible in the light of the above teachings. It is therefore to be understood that within the scope of the appended claims the invention may be practiced otherwise than as specifically described.

What is claimed is:

1. In a rocket propelled missile of the liquid bi-propellant type having a supply of liquid fuel and liquid oxidizer, a combustion chamber in which the fuel and oxidizer are adapted to react and produce propulsive gases, primary injector means for injecting fuel and oxidizer into the combustion chamber, separate secondary injector means for injecting fuel and oxidizer into the combustion chamber at a lesser rate of flow than that of the primary injector means, the combined flows of the primary and secondary injector means being operable during an initial boost thrust stage of the missile and the secondary injection means, only, being operable during a sustainer thrust stage of the missile, means for sensing missile skin temperature, pressure controlled valve means operable under control of said means for sensing skin temperature for permitting the flow of both liquids during the boost thrust stage of the missile and until a missile limiting temperature is reached, said valve means being constructed and arranged to discontinue flow of the liquids to the primary injector means when said limiting temperature is reached and thereafter permit flow of the liquids only to the secondary injector means at a rate to maintain the missile velocity at a value insufficient to produce missile temperature in excess of said critical temperature.

2. Apparatus in accordance with claim 1 wherein said pressure controlled valve means comprises a source of substantially constant gas pressure adapted to be supplied to a pressure chamber, and valve means operable by said means for sensing missile skin temperature for bleeding gas from said pressure chamber to reduce the pressure to a value below said constant pressure, and secondary valve mean operable in response to the pressure in the pressure chamber for varying the rate of flow of the liquids during the sustainer thrust stage of the missile.

3. Valve apparatus comprising, a pressure chamber having a cylindrical bore and containing a slide valve normally closing a communicating passage, an axially aligned concentric cylinder containing a slideable control piston connected to the slide valve, an aperture extending through the slide valve for communicating pressure from the pressure chamber to the control piston, a spring within the cylinder engaging the control piston urging the slide valve toward its closed position, a primary valve including a rectilinearly movable valve head forming a part of a surrounding rupturable seal, an axially aligned cylinder concentric with the valve head having a movable actuating piston therein connected to said valve head, said communicating passage communicating one side of the actuating piston with the pressure chamber when said slide valve is moved away from its normally closed position, means for limiting movement of said actuating piston to a position wherein said valve head moves to a fully opened position after the seal is ruptured, means permitting said valve head to move from its fully opened position to a new position closing flow through the primary valve in response to a reduction in pressure in said pressure chamber, a secondary valve including a valve head connected to said control piston and movable therewith in equal increments, and a by-pass passage communicating said primary valve with said secondary valve only after said seal is ruptured.

References Cited in the file of this patent
UNITED STATES PATENTS 2,763,126    Halford et al. _____ Sept. 18, 1956

FOREIGN PATENTS 680,718    Great Britain _____ Oct. 8, 1952
719,946    Great Britain _____ Dec. 8, 1954